(12) United States Patent
Kobayashi et al.

(10) Patent No.: US 6,327,432 B1
(45) Date of Patent: Dec. 4, 2001

(54) INSTANT FILM PACKS

(75) Inventors: Kenji Kobayashi; Minoru Ono, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/732,713

(22) Filed: Dec. 11, 2000

(30) Foreign Application Priority Data

Dec. 10, 1999 (JP) .................................... 11-352212
Nov. 27, 2000 (JP) .................................... 12-358724

(51) Int. Cl.⁷ .............................. G03B 17/50; G03B 17/26
(52) U.S. Cl. .............................. 396/31; 396/527; 396/583
(58) Field of Search ..................... 396/527, 583, 396/30–38; 206/455; 264/173.15, 210.7

(56) References Cited

U.S. PATENT DOCUMENTS 4,772,905 * 9/1988 Yoshimura et al. .................. 396/527
5,324,467 * 6/1994 Anderson, II .................... 264/173.15
6,192,197 * 2/2001 Ono ........................................ 396/30

* cited by examiner

*Primary Examiner*—D Rutledge
(74) *Attorney, Agent, or Firm*—Sughrue, Mion, Zinn, Macpeak & Seas, PLLC

(57) ABSTRACT

The present invention is directed to developer solution trapping chips for use in a peel-apart type instant film unit, wherein the developer solution trapping chips are manufactured by cutting a continuous chip blank obtained by contour extrusion, which sets quickly, exhibits little deformation when wound on a reel, and produces a limited amount of swarf in cutting operation. The developer solution trapping chips are made of glycol-modified polyester and have preferably a trapezoidal or semicircular cross section.

4 Claims, 4 Drawing Sheets

INSTANT FILM PACKS

BACKGROUND OF THE INVENTION

1. Field of the Invention

The present invention relates to an instant film pack incorporating peel-apart type instant film units.

2. Description of the Related Art

Presently available self-developing instant film units include, besides those of mono-sheet type, peel-apart type film units which have conventionally been used. A peel-apart type instant film unit (hereinafter referred to simply as the film unit) includes a photosensitive sheet and an image-receiving sheet which are joined by a connecting sheet. A plurality of such film units are stacked in layers and accommodated in a container to form a film unit assemblage, or a film pack, wherein photosensitive sheets and image-receiving sheets are separately layered so that they are located on two opposite sides inside the film pack. When one film unit is withdrawn from the container by pulling a leader sheet of the film unit after exposure, the photosensitive sheet and the image-receiving sheet connected contiguously to the leader sheet superposed face to face and pass between a pair of developer spreading rollers. As the film unit is pulled out in this fashion, the rollers rupture a developer solution pod retaining a viscous developer solution and spread the developer solution between the photosensitive sheet and the image-receiving sheet.

An image frame sheet (hereinafter referred to also as the mask) is detachably mounted on the image-receiving sheet and a pair of spacers(hereinafter referred to also as the rails) are attached to both side edges of the mask along which the image-receiving sheet is withdrawn. The spreading width of the viscous developer solution packed in the developer solution pod is determined by the distance between the two spacers, while the thickness of the spread developer solution is determined by the total thickness of the mask and the rail.

The connecting sheet and the image frame sheet may be separate or may be formed contiguously.

The developer solution pod holds a somewhat excess amount of developer solution to make it possible to spread the developer solution with a uniform thickness and prevent insufficient spreading of the developer solution due to a shortage thereof. A remnant portion of the viscous developer solution left over after it has been spread over an area of specified image frame is carried to and trapped in an area between developer solution trapping chips (hereinafter referred to also as the solution trapping chips) which is provided next to the spacers. Since the developer solution trapping chip has a trapezoidal or semicircular cross section and its height is several times larger than the total thickness of the mask and the rail, the thickness of the developer solution spread in the area between the solution trapping chips is also several times larger than the thickness of the developer solution spread in the area within the image frame. As a consequence, the developer spreading length in the former area is shortened by a factor of several times so that the developer solution would leak in no case from the film unit.

FIG. 1 shows the structure of a conventional container 2 of a film pack used for accommodating peel-apart type film units. The container 2 comprises an upper case section 4 constituting an upper face of a rectangular parallelepiped-shaped box-like case, a bottom cover 6 covering a bottom opening of the upper case section 4 and constituting a bottom face of the case, and a film pressure plate 5 located between the upper case section 4 and the bottom cover 6. An exposure opening 3 is formed in the upper case section 4 as illustrated. The lower edge of a leading end wall 7 of the upper case section 4 is located above the lower edges of side walls of the upper case section 4, so that there is formed a film unit exit immediately beneath the leading end wall 7 when the bottom cover 6 is fitted to the upper case section 4 to close its bottom opening.

FIG. 2 is cross-sectional view of the film pack as it is accommodated in a holder. Photosensitive sheets 40 and image-receiving sheets 41 of multiple peel-apart type film units are separately stacked and positioned above and beneath the film pressure plate 5 inside the film pack container 2. The film pack is provided with a light-shielding sheet 42 in unused state for closing the exposure opening 3. While the film pack container 2 usually contains approximately ten film units, only one film unit is depicted in FIG. 2 together with the light-shielding sheet 42 for the sake of simplification of the drawing. FIG. 2 shows that the photosensitive sheet 40 is located above the film pressure plate 5, facing the exposure opening 3, and that the image-receiving sheet 41 is positioned underneath the film pressure plate 5, wherein the photosensitive sheet 40 and the image-receiving sheet 41 are joined together by the connecting sheet 47.

FIG. 3 shows the structure of a conventional film unit 10. The film unit 10 is constructed such that, when a leader sheet 43 is withdrawn, by means of the connecting sheet 47 connected contiguously to the leader sheet 43, a photosensitive sheet 40 and an image-receiving sheet 41 are superposed face to face and caused to pass through a pair of developer spreading rollers 25.

More specifically, when a user pinches and pulls the leader sheet 43 projecting from between the developer spreading rollers 25, the photosensitive sheet 40 is caused to move leftward (as illustrated in FIG. 2), turn upside down at a curved portion 13 of a film pressure plate 5, and advance to the bottom side of the film pressure plate 5 with an exposed face of the photosensitive sheet 40 facing down. As the film unit 10 is withdrawn in this fashion, a developer solution pod 46 attached to the reader sheet 47 passes over the image-receiving sheet 41 and moves toward the developer spreading rollers 25. When the connecting sheet 47 interconnecting the image-receiving sheet 41 and the leader sheet 43 is fully stretched, the exposed face of the photosensitive sheet 40 is superposed with the image-receiving sheet 41. When the film unit 10 is further withdrawn by pulling the leader sheet 43, the photosensitive sheet 40 and the image-receiving sheet 41 together move toward the developer spreading rollers 25 superposed in superposed relationship.

Immediately before the developer solution pod 46 passes between the developer spreading rollers 25, the developer solution pod 46 is ruptured. As the film unit 10 is further withdrawn, developer solution packed in the developer solution pod 46 is spread with a uniform thickness between the photosensitive sheet 40 and the image-receiving sheet 41.

FIG. 4 is an enlarged perspective view of the image-receiving sheet 41. An image frame sheet 83 is detachably mounted on the image-receiving sheet 41 and a pair of spacers 81 are attached to both side edges of the image frame sheet 83 along which the image-receiving sheet 41 is withdrawn. A pair of developer solution trapping chips 82 are provided at trailing end areas of the rails 81 as illustrated. As the film unit 10 is pulled by its leader sheet 43, a remnant portion of the developer solution left over after it has been spread over a specified image frame area is carried to and trapped in an area just before the developer solution trapping chips 82. Therefore, the developer solution would not leak to the exterior when the film unit 10 is withdrawn from a holder. After the film unit 10 has been fully pulled out from between the developer spreading rollers 25, the film unit 10 is left until specific developing and fixing time elapse. When this waiting time has elapsed, a positive image appears on the image-receiving sheet 41. A finished photographic print is obtained when the image-receiving sheet 41 is peeled off from the film unit 10.

Polyvinyl chloride has conventionally been used for making the developer solution trapping chips since they are produced by first forming a continuous chip blank by contour extrusion and then cutting it into a desired size. Polyvinyl chloride is slow to set in contour extrusion process and is difficult to handle due to its tendency to deform when wound on a reel in the form of a continuous shape. Furthermore, the continuous shape of polyvinyl chloride produces a large amount of swarf in cutting operation.

SUMMARY OF THE INVENTION

It is an object of the invention to provide developer solution trapping chips which make it possible to solve the aforementioned problems.

These problems of the prior art have been solved by instant film packs of the present invention described below.

A first aspect of the present invention relates to an instant film pack which incorporates a peel-apart type instant film unit, the instant film pack comprising a container including an approximately rectangular parallelepiped-shaped box-like case, in which an exposure opening is formed in an upper face of the case and a film unit exit is formed in a front face of the case contiguous to the upper face, and a film pressure plate located between the upper face and a bottom face of the case, the instant film unit comprising a photo-sensitive sheet connected to a leader sheet and positioned above the film pressure plate and just beneath the exposure opening, an image-receiving sheet connected to the leader sheet via a connecting sheet and positioned on the bottom side the film pressure plate such that the photosensitive sheet and the image-receiving sheet are superposed face to face and withdrawn from the container through the film unit exit when a far end of the leader sheet projected from the film unit exit is pulled, a developer solution pod provided on the leader sheet, spacers for determining spreading thickness of a developer solution detachably attached along both side edges of the image-receiving sheet parallel to its withdrawal direction, and a developer solution trapping chip provided next to trailing ends of the spacers, wherein the developer solution trapping chip is made of glycol-modified polyester.

A second aspect of the present invention relates to an instant film pack stated above, wherein the glycol-modified polyester is a copolyester whose acid component is terephthalic acid (TPA) and alcohol components are ethylene glycol (EG) and cyclohexanedimethanol (CHDM).

A third aspect of the present invention relates to an instant film pack, wherein, the glycol-modified polyester is pigmented black and the developer solution trapping chip is manufactured by subjecting the glycol-modified polyester to a contour extrusion operation to form it into a trapezoidal or semicircular cross section. The cross section of the developer solution trapping chips may be arch-shaped, preferably the shape of a low arch.

DESCRIPTION OF THE PREFERRED EMBODIMENTS

Figure 1:
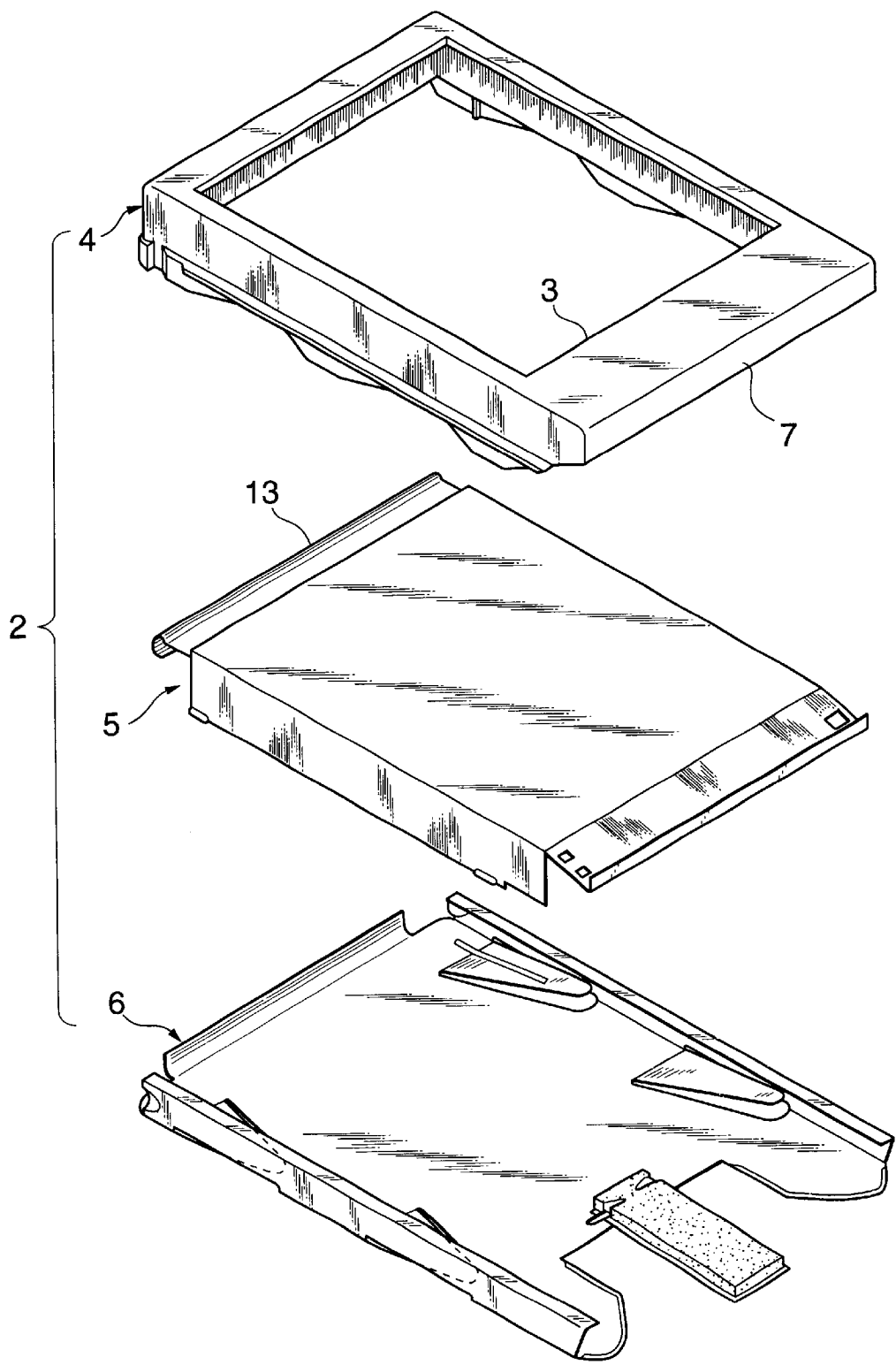
FIG. 1 is an exploded perspective view of a container of a film pack used in the present invention.
Figure 2:
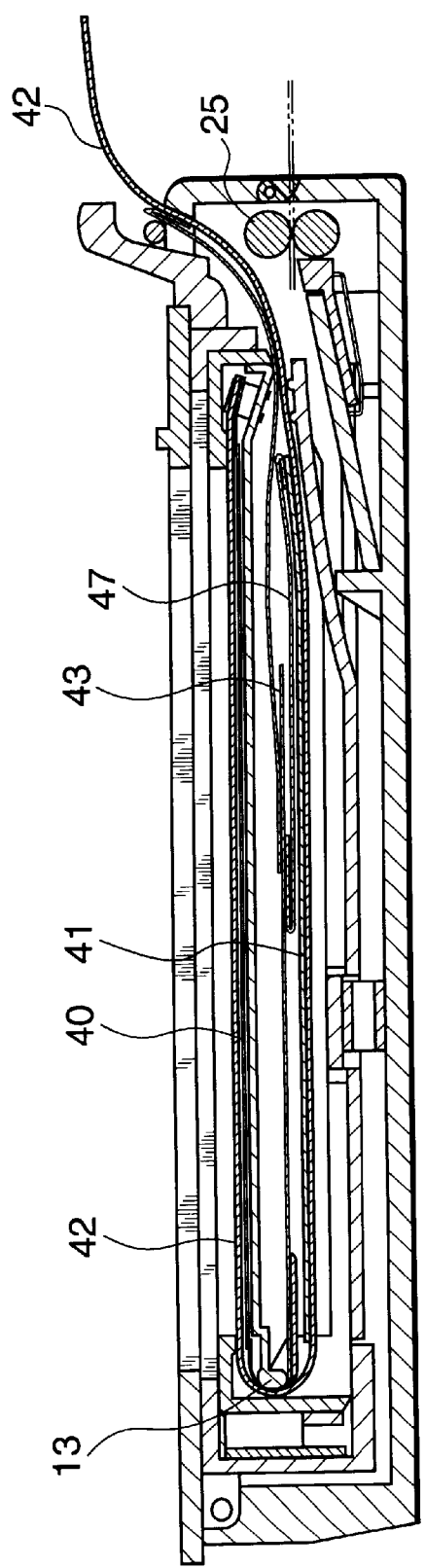
FIG. 2 is cross-sectional view of the film pack of the invention as it is accommodated in a holder.
Figure 3:
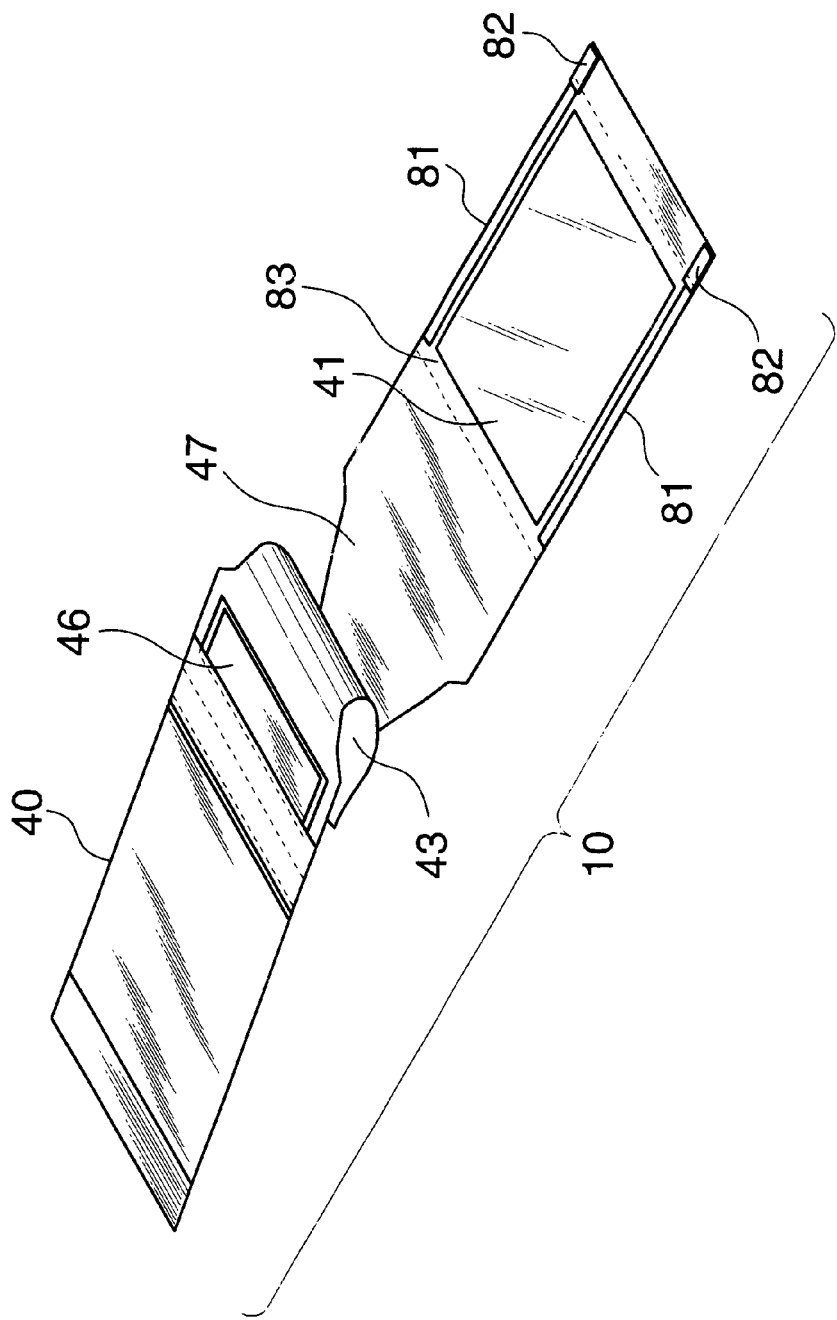
FIG. 3 is a perspective view showing the structure of a film unit of the invention.
Figure 4:
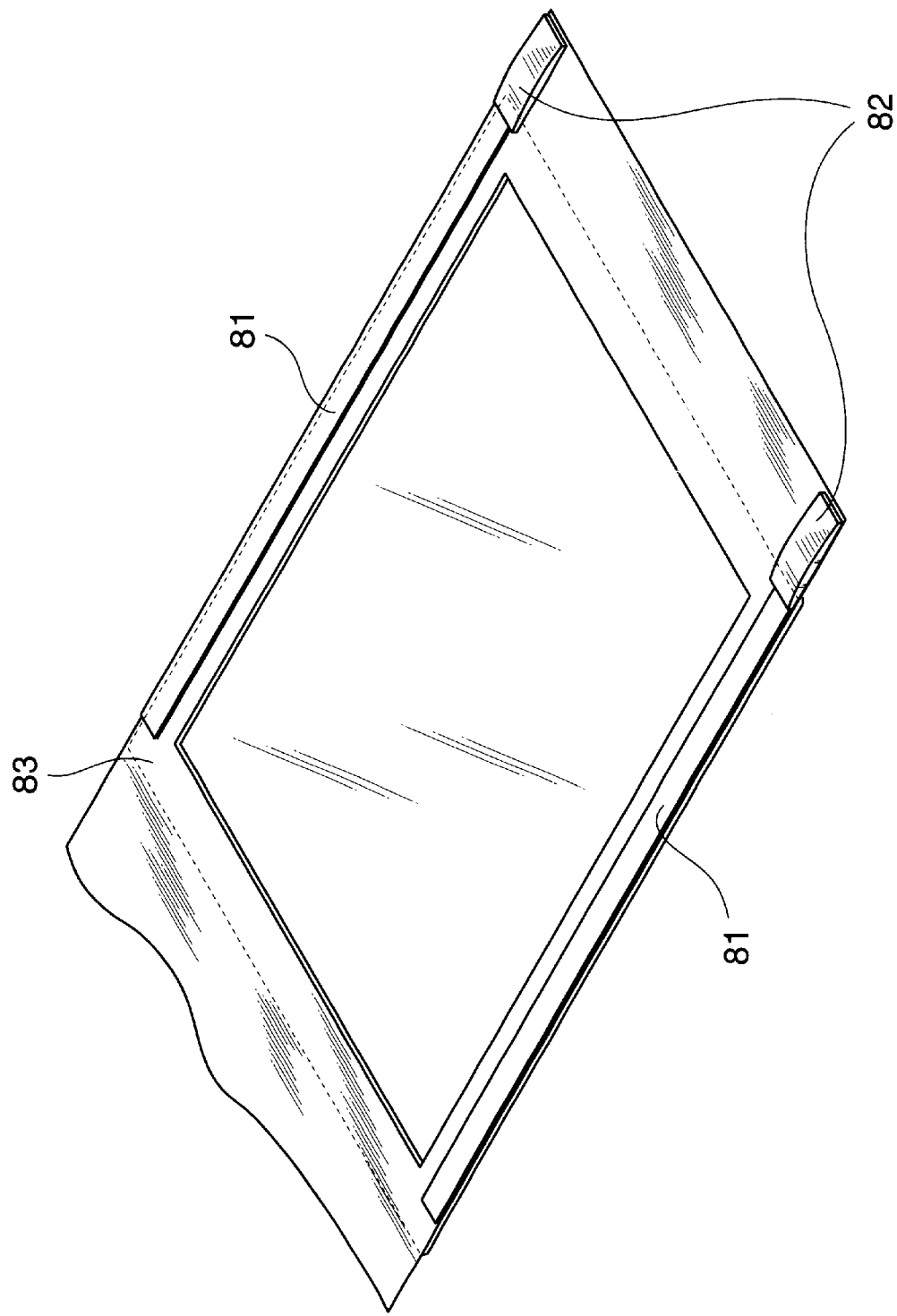
FIG. 4 is an enlarged perspective view of the image-receiving sheet of the present invention.

The glycol-modified polyester (PETG) of the present invention is a copolyester whose acid component is terephthalic acid (TPA) and alcohol components are ethylene glycol (EG) and 1,4-cyclohexanedimethanol (CHDM) as described above. It is possible to achieve the degree of crystallinity of 20% or less by making the copolymerization content of CHDM to fall between 10 mol % and 65 mol %. More preferably, it is possible to make the glycol-modified polyester a completely amorphous polymer by making the copolymerization content of CHDM to fall between 33 mol % and 47 mol %. This amorphous PETG has versatile extrusion moldabilities, featuring, in particular, excellent contour extrusion properties. Specific examples of the PETG of the invention are products manufactured and marketed by Eastman Chemical Company under the registered trademark "EASTAR" or "PROVISTA." These are available in different grades designated as EASTER 6763, 5116, GN071, GN007, DN004, AS004, and so on. Of these specific examples, PROVISTA is the most preferable, featuring a relative density of 1.27, a glass transition temperature of 81° C., a number-averaged molecular weight of approximately 26,000, and extrusion temperatures of 195° C. to 275° C.

It is preferable to incorporate a filler, a stabilizing agent, a slipping agent, or a reinforcing agent into the glycol-modified polyester.

While the developer solution trapping chip of the present invention may be transparent, it is desirable that the chips have light-shielding properties. Developer solution trapping chips are produced by extruding black-pigmented PETG. The PETG may be pigmented in black by using a color master batch or dry color incorporated carbon black. When using PROVISTA, it is preferable to use a color master batch using PROVISTA as a binder.

A continuous shape for producing the developer solution trapping chips of the invention using the glycol-modified polyester (PETG) can be uniformly wound on a reel, although the shape is formed by continuous contour extrusion and coated with a hot-melt adhesive. Furthermore, only a limited amount of swarf is produced in cutting operation, it is possible to prevent the attachment of debris to film units. The developer solution trapping chips of the present invention provide the same advantageous effects as described above when used in the production of not only instant film units of regular size but also peel-apart type instant film units of 4×5-inch format.

EXAMPLES

Example 1

Approximately 3 parts by weight of carbon black and approximately 20 parts by weight of calcium carbonate were added to 100 parts by weight of PETG (EASTAR 6763) produced by Eastman Chemical Company and they were well kneaded to produce a mixture. The mixture was then extruded using contour extrusion machine PMS40-25 manufactured by IKG Co., Ltd. and a resultant continuous chip shape was wound on a reel. Developer solution trapping chips had a generally trapezoidal cross section whose lower (longer) base was 14 mm, upper (shorter) base was 5 mm, and its height was 0.65 mm. This contour extrusion operation was carried out at an extrusion temperature of approximately 215° C., a screw speed of 15 r.p.m., and an extrusion pressure of 1 ton/cm$^2$.

After the contour extrusion operation for producing the continuous shape to be used in making the developer solution trapping chips, a hot-melt adhesive was applied to the continuous shape. Then, an SBS adhesive manufactured by Nitta Gelatin Inc. was applied with a width of 9 mm to a central part of the bottom surface of the continuous shape having the trapezoidal cross section, using a 0.25 mm blade. Although the hot-melt adhesive was applied at a temperature of 165° C., the continuous shape scarcely deformed and could be uniformly wound on the reel.

The continuous shape thus prepared was cut to a width of 5 mm to produce developer solution trapping chips. It was possible to continuously cut the continuous shape without causing adhesion of the hot-melt adhesive to a cutting blade, and only a limited amount of swarf was produced from the hot-melt adhesive. A peel-apart type film pack of regular size was produced using a combination of masks measuring approximately 50 μm in thickness, rails measuring approximately 80 μm in thickness and the developer solution trapping chips of the invention as described above. It has then been verified that photographic prints free of undesirable stains caused by foreign matter could be obtained from the film pack thus produced.

Example 2

The developer solution trapping chip was manufactured the same way as Example 1 except that PETG (EASTER 6963) was replaced with PROVISTA supplied by Eastman Chemical Company. Similar good results were obtained.

What is claimed is:

1. An instant film pack incorporating a peel-apart type instant film unit, said instant film pack comprising a container including a rectangular parallelepiped-shaped box-like case, in which an exposure opening is formed in an upper face of the case and a film unit exit is formed in a front face of the case contiguous to the upper face, and a film pressure plate located between the upper face and a bottom face of the case, said instant film unit comprising:

a photosensitive sheet connected to a leader sheet and positioned above the film pressure plate and just beneath the exposure opening;

an image-receiving sheet connected to the leader sheet via an connecting sheet and positioned on the bottom side the film pressure plate such that the photosensitive sheet and the image-receiving sheet are superposed face to face and withdrawn from the container through said film unit exit when a far end of the leader sheet projected from said film unit exit is pulled;

a developer solution pod provided on the leader sheet; spacers for determining spreading thickness of a developer solution detachably attached along both side edges of the image-receiving sheet parallel to its withdrawal direction; and a developer solution trapping chip provided next to trailing ends of the spacers;

wherein said developer solution trapping chip is made of glycol-modified polyester.

2. An instant film pack as claimed in claim 1, wherein said glycol-modified polyester is a copolyester whose acid component is terephthalic acid (TPA) and alcohol components are ethylene glycol (EG) and cyclohexanedimethanol (CHDM).

3. An instant film pack as claimed in claim 1, wherein said glycol-modified polyester is pigmented black and said developer solution trapping chip is produced by subjecting said glycol-modified polyester to a contour extrusion operation to form it into a trapezoidal or semicircular cross section.

4. An instant film pack as claimed in claim 2, wherein said glycol-modified polyester is pigmented black and said developer solution trapping chip is produced by subjecting said glycol-modified polyester to a contour extrusion operation to form it into a trapezoidal or semicircular cross section.

* * * * *